Sept. 27, 1927.
D. H. REEVES
LIQUID LEVEL GAUGE
Filed Dec. 3, 1920
1,643,469
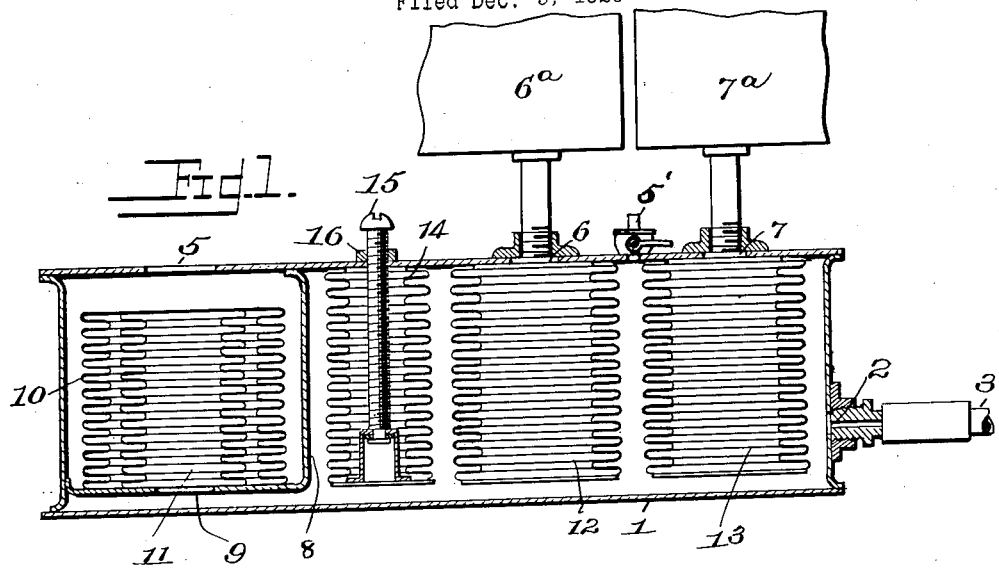
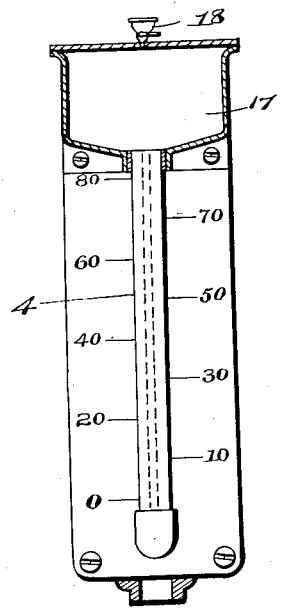

Patented Sept. 27, 1927.

1,643,469

UNITED STATES PATENT OFFICE.

DONALD H. REEVES, OF DAYTON, OHIO.

LIQUID-LEVEL GAUGE.

Application filed December 3, 1920. Serial No. 428,095.

My invention relates to hydraulically operated liquid level gauges or indicators for visually indicating the quantity or level of liquid in a main tank or reservoir. The invention is designed primarily for use on airplanes or other aircraft to indicate at the instrument board the amount of gasoline in the main tank or reservoir.

It is desirable, especially in airplanes, to have a level gauge operated otherwise than mechanically in order that the indicating device may be remote from the reservoir both as regards distance and intervening objects.

A further object of the invention is to provide a gauge of the class referred to which will not necessitate the use of a gland between the reservoir and the indicating device. The improved gauge is also designed to indicate the total amount of liquid in one, two or more reservoirs or tanks. The invention is also designed to indicate the correct quantity of liquid available, regardless of changes in temperature, the device being hydraulically operated.

Another object of this invention is to provide a hydraulically operated level gauge which will permit of regulating of the quantity of liquid used in the indicating part of the device.

Other objects and advantages of the invention will appear as the description proceeds.

In the accompanying drawings:

Figure 1 is a vertical sectional view of the gauge operating means; and

Figure 2 is a view in elevation partly broken away, of the indicating device.

In the drawings it will be noted that provision is made for two reservoirs or tanks but it will become apparent as the description proceeds that one, two or more tanks or reservoirs may be provided for in the liquid level indicating means.

In carrying out the invention I provide a casing or chamber 1 having an opening 2 to which is attached a small tube 3, the latter being connected to a gauge glass 4 forming a part of the indicator shown in Figure 2, said indicator being located at any convenient or desirable point and at any desirable distance from the casing 1. When the gauge mechanism is used with one tank or reservoir, a pressure gauge may be substituted for the gauge glass 4. The casing or chamber 1 has an opening 5 communicating with the atmosphere and also has other openings 6 and 7 to connect with two tanks or reservoirs 6ª and 7ª or two compartments of the same reservoir, the bottoms of said reservoirs or compartments being above and in communication with the openings 6 and 7.

The casing 1 contains a partition 8 having an opening 9 therein. Bellows 10 and 11 are arranged within the partition 8, said bellows being telescopically arranged one within the other and each being preferably formed of a thin metal cylinder with deeply corrugated side walls to provide for ready expansion and contraction of the same under pressure. The bellows 10 and 11 are fastened at their bottom ends to the horizontal portion of the partition 8 and provided with a common head at the upper ends thereof. The space enclosed between the bellows 10 and 11 is filled with a liquid having a high coefficient of expansion. The bellows 11 communicates with the chamber 1 through the opening 9.

Other bellows 12, 13 and 14 are arranged in the casing 1 and have their upper ends rigidly attached to the top of said chamber or casing, the lower ends of the last named bellows being closed by imperforate heads as shown. The interior of the bellows 12 and 13 are in communication with the tanks 6ª and 7ª respectively through suitable connections in the openings 6 and 7. A regulating screw 15 passes through a nut 16 fastened to the top of the chamber 1 and is adapted to vary the length of the bellows 14. At the top of the gauge glass 4 and communicating therewith is a closed cup 17 forming a relatively large compression chamber. The cup 17 is necessary mainly to allow a considerable quantity of air and compression thereof and also to prevent liquid from being lost in case of inversion of the gauge glass 4 which may occur in the operation of an airplane. The cup 17 may be omitted in the event that the gauge glass 4 does not need to be inverted. The space around the bellows 12, 13 and 14 and within the bellows 11 and the tube 3 is filled through a pet-cock 18 at the top of the compression chamber 17 and gauge glass 4 with a liquid having a low coefficient of expansion, the air in the chamber 1 escaping through the cock 5' which is obviously closed when the chamber is filled with liquid, the system being filled with such liquid until the zero point on the gauge glass 4 is reached. The level of such liquid may be regulated by means of the adjusting or regulating screw 15 enabling the readings on the gauge glass 4 to be correctly fixed.

The operation of the above described device will now be described.

Assume two equal compartments of the same tank or reservoir or two reservoirs having a shape, size and location such that equal quantities of liquid in each will create the same pressure at same level below the bottoms of such tanks or compartments. As shown in the drawings, the tanks or reservoirs are empty and the gauge glass 4 would indicate zero. As the tanks or reservoirs fill, the bellows 12 and 13 expand, forcing the liquid in casing 1 through the tube 3 into the glass 4 compressing air in cup 17. It is evident that glass 4 will give a true indication or reading of the total contents regardless of the relative contents of the two tanks, the air in the chamber 17 being compressed as the liquid under pressure rises in the glass 4.

Assume that there is an increase in temperature. The liquid between the bellows 10 and 11 will expand, increasing the volume in bellows 11 and compensating for the increase of volume in chamber 1 due to the expansion of the indicating liquid and the air in cup 17, providing of course that the proper relation exists between the volumes and coefficients of expansion of the two liquids and the volume of cup 17.

Now assume a single tank or reservoir of any shape, size or location. A proper calibration is all that is necessary to get correct readings on gauge glass 4 or the pressure gauge if such is used. Now assume two or more tanks or reservoirs at different levels, different capacity, or of different shapes, but each of such shape that it has an unvarying horizontal cross sectional area. Proper readings of total capacity may be accomplished by making the bellows 12 and 13 of different stiffness or size such that equal increments of liquid in each tank will cause the same increase in volume of each bellows.

While I have illustrated one embodiment of my invention it is to be understood that the same principle may be carried out in many other ways under the terms and scope of the following claims.

What I claim is:

1. In a liquid level gauge, the combination of a liquid level indicator embodying a normally upright graduated tube and a relatively large compression chamber at the top of said tube, a closed liquid receiving pressure chamber in free communication with said tube, a bellows in said pressure chamber but closed against communication therewith and having one head fixedly held therein, and the opposite head free for movement, said bellows having an opening in its fixed head whereby it may be brought in communication with the liquid to be gauged, a liquid having a low coefficient of expansion in the pressure chamber and in a portion of the graduated tube and an automatically operated temperature controlled compensating means in communication with said pressure chamber.

2. In a liquid level gauge, the combination of a liquid level indicator embodying a normally upright graduated tube and a relatively large compression chamber at the top of said tube, a closed liquid receiving pressure chamber in free communication with said tube, a bellows in said pressure chamber but closed against communication therewith and having one head fixedly held therein and the opposite head free for movement, said bellows having an opening in its fixed head whereby it may be brought in communication with the liquid to be gauged, a liquid having a low coefficient of expansion in the pressure chamber and in a portion of the graduated tube, a pressure regulating bellows in said pressure chamber, manually operable means for compressing and expanding the last named bellows to positively vary the height of liquid in said tube, and an automatically operated temperature controlled compensating means in communication with said pressure chamber.

3. In a liquid level gauge, the combination of a liquid level indicator embodying a normally upright graduated tube and a relatively large compression chamber at the top of said tube, a closed liquid receiving pressure chamber in free communication with said tube, a bellows in said pressure chamber but closed against communication therewith and having one head fixedly held therein, and the opposite head free for movement, said bellows having an opening in its fixed head whereby it may be brought in communication with the liquid to be gauged and a liquid having a low coefficient of expansion in the pressure chamber and in a portion of the graduated tube, a partition in the chamber and temperature compensating means comprising two bellows one smaller than and within the other the two having common heads one head only being fixed to the partition and having an opening whereby the interior of the smaller bellows is in communication with the liquid in the chamber, the space between the concentric walls of the bellows containing a liquid having a high coefficient of expansion and the outer wall of the larger bellows being open to the atmosphere.

In testimony whereof I have affixed my signature.

DONALD H. REEVES.